United States Patent
Arikawa et al.

[15] 3,679,866
[45] July 25, 1972

[54] PULSED ARC SPRAY WELDING IN A NARROW GROOVE

[72] Inventors: Masayasu Arikawa, Fujisawa; Tomokazu Godai; Toshio Arai, Kamakura; Hironosuke Kada, Kamakura; Akihiko Iochi, Kamakura, all of Japan

[73] Assignee: Kobe Steel, Ltd., Kobe, Japan

[22] Filed: June 9, 1970

[21] Appl. No.: 44,808

[30] Foreign Application Priority Data

June 10, 1969 Japan..................................44/45683

[52] U.S. Cl...........................................219/137, 219/131
[51] Int. Cl................................................B23k 9/00
[58] Field of Search....................219/137, 131, 61, 135

[56] References Cited

UNITED STATES PATENTS

| | | | |
|---|---|---|---|
| 3,071,680 | 1/1963 | Anderson et al. | 219/131 |
| 3,249,735 | 5/1966 | Needham | 219/131 |
| 3,350,539 | 12/1967 | Manz et al. | 219/131 X |
| 3,365,564 | 1/1968 | Boughton | 219/131 |
| 3,519,780 | 7/1970 | Potapieusky et al. | 219/137 X |
| 3,531,619 | 9/1970 | Broodman | 219/137 |

OTHER PUBLICATIONS

" Pulsed Arc Welding Makes Headway" Metal Working Production, Aug. 3, 1966, pp. 33– 35

Primary Examiner—J. V. Truhe
Assistant Examiner—George A. Montanye
Attorney—Oblon, Fisher & Spivak

[57] ABSTRACT

A process for multi-layered spray arc welding using a gas shielded consumable electrode which comprises: preparing the welding edge of each of a pair of plate members such that when said members are placed into welding alignment, the combination of their prepared edges will together form an I-shaped or V-shaped welding line groove between said members, placing said plate members into welding alignment so as to form said welding line groove, and spray arc welding said plate members along said welding line groove with consumable electrode in the presence of a shielding gas by passing a welding current having a rectangular waveform through said electrode to said welding line, such that at recurring intervals, a welding arc having a current density of from 100 to 300 amp/mm² is established between the tip of said consumable electrode and said welding line groove for a period of time of from 0.3 to 5 seconds, and extinguished for a period of time of from 0.2 to 3 seconds, such that when said arc is established, molten metal droplets are transferred to said groove, and when said arc is extinguished, the transfer of molten metal droplets is interrupted.

11 Claims, 8 Drawing Figures

A: TRAVERSING DISTANCE OF ARC POINT
B: DIAMETER OF CRATER
C: LENGTH OF UNIT BEAD

INVENTORS
MASAYASU ARIKAWA
TOMOKAZU GODAI
TOSHIO ARAI
HIRONOSUKE KADA
AKIHIKO IOCHI (a)

(b)

(c)

A: TRAVERSING DISTANCE OF ARC POINT
B: DIAMETER OF CRATER
C: LENGTH OF UNIT BEAD

INVENTORS
MASAYASU ARIKAWA
TOMOKAZU GODAI
TOSHIO ARAI
HIRONOSUKE KADA
AKIHIKO IOCHI

BY Oblon, Fisher & Spivak
ATTORNEYS

PULSED ARC SPRAY WELDING IN A NARROW GROOVE

BACKGROUND OF THE INVENTION

1. Field Of The Invention:

The present invention relates to a process of electric arc welding and more particularly to a welding process whereby thick plate materials which are mutually aligned so as to form a so-called narrow width V-shaped or I-shaped groove between the adjacent plates, are efficiently welded in any of a variety of welding positions to provide a high quality weld.

2. Description Of Prior Art:

Conventional arc welding processes for welding thick sheets of steel generally require that a V-shaped, X-shaped, or Y-shaped groove be formed, normally by means of gas cutting or machining, along the weld line at the edges of the abutting steel sheets. The conventional prior art techniques, however, for forming these grooves, generally require a series of steps which often result in a substantial increase in the quantity of chips produced during the gas cutting or machining procedures, and in a consequent increase in the quantity of weld metals deposited during the welding procedure.

Recently, so-called narrow gap welding processes have been developed for eliminating many of these prior art defects. One such process is disclosed in U.S. Pat. No. 3,328,556 to Nelson, whereby a narrow width I-shaped groove is used for welding purposes. According to that disclosure, the workpiece is first aligned to form a joint having a narrow width opening of approximately three-sixteenths of an inch. A consumable electrode is extended through the opening and is held by a fine diameter contact tube which is sheathed with electric insulation. The narrow width opening is then subjected to a continuous gas shielded arc welding process at a relatively small heat input. Since the electrode is characterized by a very small diameter and the welding current is maintained at a comparatively low value, the welding process can be performed in any of a variety of welding positions without danger of spattering molten weld droplets. Although the results is a weld which is characterized by excellent notch toughness, the Nelson process requires that the consumable electrode wire be precisely positioned in the groove of the workpiece, otherwise the process will result in insufficient penetration of the welding bead. Since the precise positioning of the consumable electrode is quite difficult, the Nelson welding process has been found to be unacceptable for many commercial applications.

Another welding process of a similar character has been disclosed in U.S. Pat. No. 3,325,626, which teaches the concept of feeding a relatively large diameter consumable electrode into the narrow groove of the workpieces to be joined. A contact tube is not used. By making successive welding passes using a gas shielded welding process, wherein the welding current is maintained at a comparatively high value, adequate weld material will be deposited. Although this process results in good bead penetration, the welding position is limited to the flat position. In any type of overhead position, the molten weld metal droplets will tend to spatter, thereby making it difficult to obtain the formation of a well formed penetration bead.

SUMMARY OF THE INVENTION

Accordingly, it is an object of this invention to provide an electric arc welding process whereby the quantity of weld metal is controlled relative to conventional electric arc welding processes.

Another object of this invention is to provide an electric arc welding process whereby relatively thick plates forming a narrow groove can be effectively welded.

Still another object of this invention is to provide a process of electric arc welding whereby the welding process can be performed in any welding position.

A further object of this invention is to provide an improved gas shielded consumable electric arc welding process for welding adjoining thick plates which are aligned so as to form a narrow groove therebetween.

These and other objects have now herein been attained by an improved arc welding process wherein a pair of relatively thick plate members having a thickness of about 12 mm. or greater are aligned prior to multi-layer welding, so as to form a slight groove or gap between the workpieces to be joined, such that when the groove is shaped, the width of the groove is in the range of from 4 mm. to 15 mm., and when the groove is shaped, the width varies from about 0 mm. to 15 mm. at its minimum spacing to 4 mm. to 15 mm. at its maximum spacing. A shielding gas is used in making the weld and a welding current having a rectangular wave-form is applied such that a recurring arc, characterized by a comparatively high current density of a value in the range of 100 to 300 amp/mm$^2$ is established between the tip of the consumable electrode and the workpiece for 0.3 to 5 seconds. The zero current phase of the wave-form will last for 0.2 to 3 seconds with almost no, or very little transfer of molten weld metal droplets therebetween.

DETAILED DESCRIPTION OF PREFERRED EMBODIMENTS

The consumable electrode arc welding process of the present invention can be operated with the application of a welding current having a wave-form such that an arc of comparatively high current density will be intermittently established between the electrode tip and the workpiece while the spray or globular transfer of molten weld metal occurs therebetween. This differs from conventional narrow gap welding processes in the application of the welding current and in the process for depositing molten weld metal into the groove of the workpiece.

By the present process, efficient welding can be easily attained without sacrificing the degree of penetration of the molten weld metal into the opposed sidewalls of the groove.

According to the present invention, the welding edges of the plate members are shaped such that when the plate members are aligned in welding position, a V-shaped or I-shaped groove is formed between the adjacent edges of the plate members to be welded together. When the groove is I-shaped, the width of the groove should be in the range of 4 mm. to 15 mm. and when the groove is V-shaped, the width of the groove should vary from about 0 mm. to 15 mm. at its narrowest point to about 4 mm. to 15 mm. at its widest and uppermost point. Preferably, however, when the groove is V-shaped and the narrowest point of the groove is in the range of from 0 mm. to 3 mm., the uppermost gap should have a width of from 6 mm. to 15 mm.

If the width of the I-shaped groove is less than 4 mm., an arc will be established between the electrode tip and one of the side walls of the groove and, therefore, the degree of penetration of the molten weld metal into the other side wall will be deleteriously affected. If the value exceeds 15 mm., on the other hand, the degree of penetration of the molten weld metal into both side walls of the groove will be deleteriously affected. Similar reasoning and limitations apply equally to the V-shaped groove.

It should be recognized, however, that the above limitation with respect to the width opening of the I-shaped or V-shaped grooves has been determined on the assumption that the extent of the welding stress will be moderate. Where the degree of welding stress will be substantial, it is preferred to use a V-shaped groove which may have an uppermost or maximum gap width above 15 mm. depending upon the amount of welding stress contemplated.

The improved welding process of the present invention may be used for welding thick sheets of steel having thicknesses of at least 12 mm. or more. Where thinner sheets are used, the advantageous welding effect of the present invention cannot be attained, nor can a well formed bead be formed when an overhead welding position is used.

Figure 1:
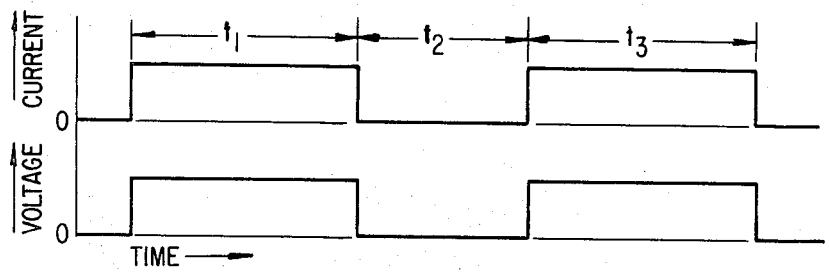
FIG. 1 is a diagram showing the various wave-forms of welding current and voltage applied in the present invention.
Figure 1:
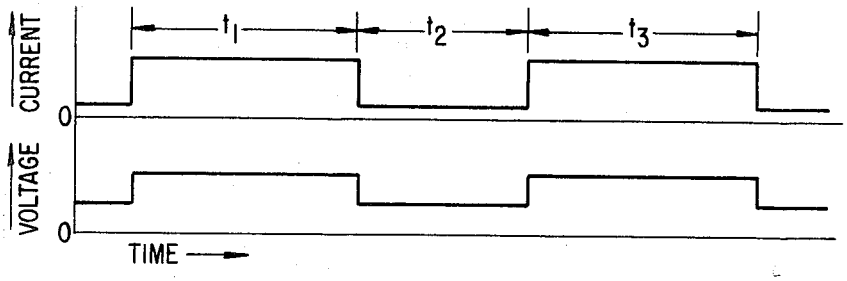
Figure 1:
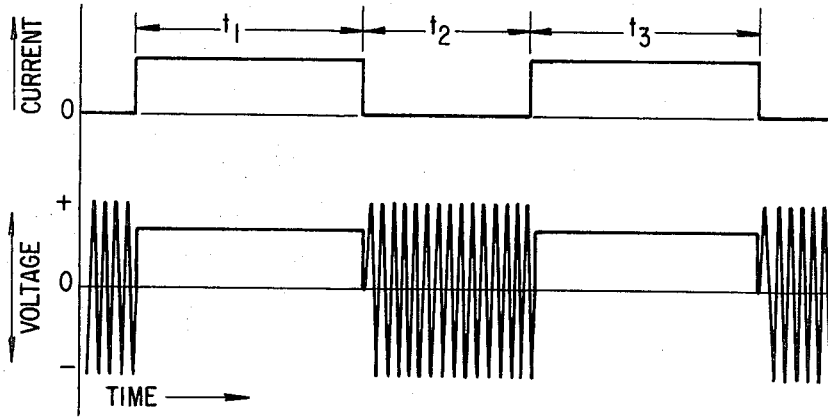

In order to prevent the bead in its molten state from spattering and to facilitate the welding of thick plate members from any welding position, a welding current of a rectangular wave-form (hereinafter referred to as the "basic wave-form") should be applied. The basic wave-form is one in which both the amperage and voltage change at recurring intervals; that is, an amperage and voltage of predetermined values are applied for a duration of time of $t_1$ during which an arc is established between the consumable electrode tip and the depth of the groove to transfer molten weld metal droplets therebetween. The values of the amperage and the voltage are then reduced to zero for a time of $t_2$ during which the arc is extinguished and the transfer of droplets is discontinued. The basic wave-form is shown in FIG. 1(a). Even though arcing occurs intermittently and transfer of the molten droplet occurs intermittently, the application of the basic wave-form welding current will result in the formation of a continuous well formed bead.

The time $t_1$ may be in the range of from 0.3 to 5 seconds, while the time $t_2$ may be in the range of from 0.2 to 3 seconds. It should be understood, however, that $t_1$ and/or $t_2$ may vary depending upon the rate of traverse of the welding torch and/or upon other variables.

The welding amperage and voltage may depend upon the diameter of the consumable electrode wire employed, but it must be of a sufficiently high value to result in the spray or globular transfer of molten weld metal droplets as compared with that used in conventional TIG successive arc welding processes for welding thin plate members.

One arc welding process wherein the welding current is forcibly intermittently applied by means of a timing device, is disclosed in the article "WELDING PRODUCTION," 1962, No. 2, pages 33 to 38. That process has been used for welding thin plate members during a TIG welding operation. In that process, an arc is established by a welding current having an amperage in the range of from 8 to 25 amps. (current density in the range of 10 to 30 amp/mm$^2$) at recurring intervals of only 0.2 seconds. During the period in which the arc was extinguished, a pilot arc was established by reducing the amperage of the welding current to an extremely low value in the range of from 0.8 to 2 amps. The result of that process is a continuous weld with a substantial reduction in the welding stress. However, the objects and advantages obtained by the process of the present invention are substantially different from that obtained by the aforementioned welding process and, there is a wide difference between the welding conditions in each of the processes.

Another welding current wave-form which may be used in the improved welding process of the present invention is shown in FIG. 1(b) which will hereinafter be referred to as the "P-type wave-form." The P-type wave-form likewise is one in which the amperage and voltage change at recurring intervals. That is, the amperage and voltage are maintained at predetermined maximum values for a period of time of $t_1$ and are thereafter reduced to predetermined minimum values for a subsequent duration of time of $t_2$.

The welding current of P-type wave-form when its amperage and voltage are respectively at the predetermined minimum values serves a similar function to that of the above-mentioned pilot arc and is provided to facilitate the re-establishment of the arc when the amperage and voltage reach the respective maximum values. However, the welding current must be of a sufficient value to establish an arc between the consumable electrode wire and the depth of the groove for a given time without causing any transfer of molten weld metal droplets therebetween, or, if such transfer does occur, to prevent transfer of only an extremely small amount of the droplets.

It is well known in the art to recurrently establish an arc by means of a so-called pilot arc during the welding operation. However, application of such pilot arcs for facilitating the recurrent welding arc has been limited to TIG welding processes performed with the use of a non-consumable electrode. In contradistinction, the present invention expands the application of the pilot arc to consumable electrode MIG successive arc welding processes. Therefore, the MIG successive arc welding processes in accordance with the present invention are substantially different from the conventional TIG welding processes as hereinafter described, both in the manner of application and in the range of its usefulness. In other words, according to the process of the present invention, a pilot arc is maintained between the consumable electrode tip and the workpiece while the transfer of molten weld metal droplets from the tip to the workpiece is prevented. In addition, since the present invention pertains to a method of welding comparatively thick plate members which can be aligned to provide a narrow width groove, it is necessary to position the consumable electrode tip with respect to the depth of the groove so as to prevent the pilot arc from establishing at the surface of one of the side walls of the groove between the pilot arc time and the time of change over from welding arc to pilot arc. Such positioning of the electrode tip with respect to the depth of the groove is unnecessary in the case of the TIG welding process because the latter does not use any consumable electrode. Accordingly, the process of the present invention is clearly different from the conventional TIG processes in view of the manner of application.

P-type wave-form welding currents can provide a number of distinct advantages as compared with the basic wave-form. For instance, among other advantages, spattering will be reduced. When a basic waveform current is applied, the arc is intermittently fired without the aid of the pilot arc and short-circuiting will occur between the electrode tip and the workpiece each time the arc is fired. This results in some spattering of the molten metal weld droplets. When the welding current is of a P-type wave-form, the successive establishment of the welding arc with the aid of the pilot arc will result in a substantial reduction in short-circuiting and a consequent reduction in the degree of spattering.

Another advantage is that the degree of penetration and filleting of the molten weld metal into the side walls of the groove will be increased. Since each period of time $t_2$ in which the pilot arc is maintained in its fired condition, the depth of the groove will be heated by the pilot arc so that the penetration of the bead in its molten state into the side walls can be facilitated.

A D.C. arc welding process has been proposed in the prior art wherein a pulse current is superimposed over a welding current. Transfer of the molten weld metal in small particles occurs between the electrode tip and the workpiece so as to form a good weld in any welding position. In order to transfer the molten weld metal from the electrode tip to the workpiece, it is necessary to overcome the surface tension of the molten weld metal on the electrode tip even while the arc is operated at a comparatively small current density. This is accomplished in the superimposed impulse wave form technique by maintaining the peak value of the impulse current at a level of at least two or more times that of the main welding current for one one-hundredth to one five-hundredth of a second. This will cause the molten weld metal on the electrode tip to be swashed into small particles and transferred to the groove of the workpieces by the action of the instantaneous electromagnetic shrinkage force imposed by the impulse wave. The process of the present invention is substantially different from the above-mentioned process with respect to the manner of application of the welding current.

Alternatively, a rectangular wave-form welding current thus be obtained in such a manner that a high frequency voltage will be generated when the circuit is opened and will terminate when the circuit is closed.

In order to provide a good weld in accordance with the process of the present invention, the arcing time and the arc ceasing time should be carefully adjusted with respect to the traverse rate of the torch during the operation.

Table 1 lists typical conditions which have been used to practice the process of the present invention. Two soft sheets of steel, each 32 mm. in thickness, were aligned to provide an I-shaped groove of 8 mm. width. Welding was performed in an overhead position using a naked consumable electrode wire of 1.6 mm. in diameter and a shielding gas composed of Ar and 15% $CO_2$ supplied at the rate of 30 lit./ min.

TABLE 1

| | Welding current | | Torch traversing speed (cm./min.) | Arc time (sec.) | Arc ceasing time (sec.) | Average heat input (kj./cm.) | Results |
|---|---|---|---|---|---|---|---|
| | Amps | Volts | | | | | |
| 1 | 320 | 31 | 25 | 1.5 | 0.5 | 17.8 | Good. |
| 2 | 300 | 30 | 15 | 2.0 | 4.0 | 12.0 | Lack of penetration. |
| 3 | 300 | 30 | 15 | 2.0 | 2.0 | 18.0 | Good. |
| 4 | 300 | 30 | 15 | 1.2 | 0.8 | 21.6 | Do. |
| 5 | 300 | 30 | 15 | 0.6 | 0.2 | 27.0 | Spatter. |
| 6 | 300 | 30 | 10 | 1.5 | 4.0 | 14.7 | Lack of penetration. |
| 7 | 300 | 30 | 10 | 1.5 | 2.5 | 20.2 | Good. |
| 8 | 300 | 30 | 10 | 1.0 | 1.0 | 27.0 | Do. |
| 9 | 290 | 29 | 5 | 0.6 | 1.5 | 28.8 | Do. |
| 10 | 320 | 31 | 25 | 5.0 | 1.0 | 19.9 | Recess in bead. |
| 11 | 300 | 30 | 15 | 5.5 | 1.5 | 28.2 | Spatter. |
| 12 | 300 | 30 | 15 | 4.5 | 1.5 | 27.0 | Recess in bead. |
| 13 | 300 | 30 | 10 | 3.5 | 2.0 | 34.4 | Do. |
| 14 | 300 | 30 | 10 | 2.0 | 2.0 | 27.0 | Good. | which is synchronously energized with a high frequency voltage may be applied in the process of the present invention. Even in the TIG welding process, the welding current is superimposed with high frequency voltage in order to facilitate the establishment of an arc. However, the present invention makes it possible with only minor limitation, to apply a high frequency voltage superimposed over the welding current in the narrow gap welding process. In other words, as illustrated in FIGURE 1(c), the high frequency voltage is utilized in such a manner as to be superimposed over the basic wave-form welding current when the welding current is terminated and de-energized when the arc is established. This function is repeated at recurring intervals throughout the welding operation. The high frequency voltage must be of a sufficient value to cause an arc to be established when the consumable electrode tip approaches the depth of the groove at a shorter distance than that of the electrode to one of the groove's sidewalls between the tip and the depth of the groove. Arcing, however, should not occur when the distance between the electrode tip and the depth of the groove increases.

As hereinbefore described, if the high frequency voltage is synchronously superimposed over the welding current, the high frequency arc discharge will occur prior to the establishment of the welding arc when the electrode tip approaches the depth of the groove with a predetermined distance remaining therebetween. This results in some improvement in the initial arcing condition. However, in this case, the consumable electrode tip should be maintained in alignment with the center line of the groove in order to prevent arcing from occurring at a position between the electrode tip and one of the side walls of said groove.

Figure 2:
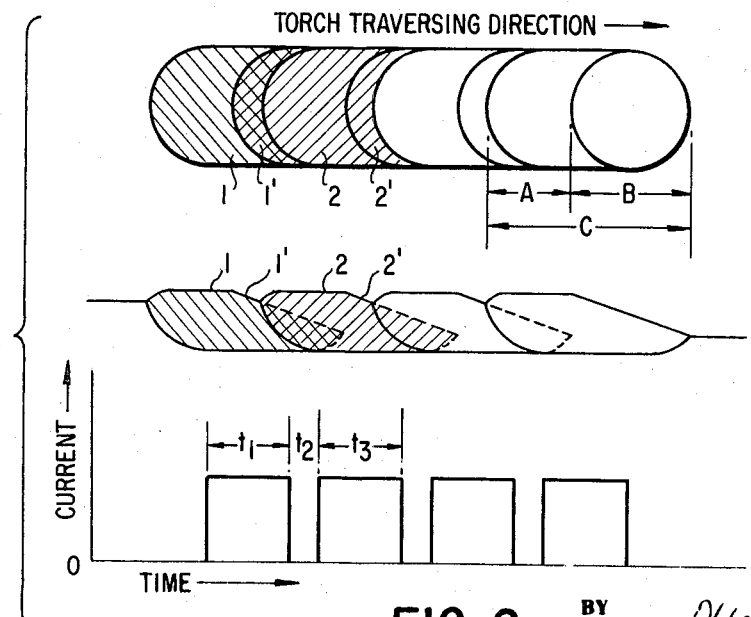
FIG. 2 is a diagram showing the relationship between the bead formation and the application of welding current in a welding process according to the present invention.
Figure 3:
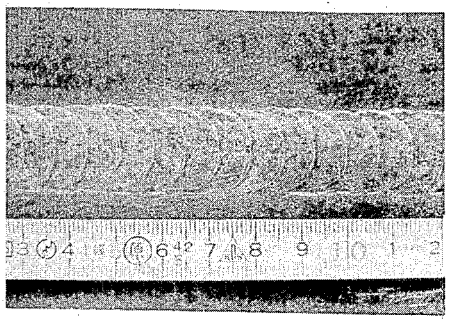
FIG. 3 is a photograph showing the uppermost layer of the bead formed in accordance with the welding process of the present invention.

The rectangular wave-form welding current can be obtained by operating a constant voltage D.C. welding device at predetermined intervals. This device should have a primary circuit and a secondary circuit, either of which are connected with an electric timing device to supply the current at the required intervals. Thus, the basic waveform welding current can be obtained by substantially opening either of the primary or secondary circuits for a predetermined period of time. The P-type wave-form welding current can be obtained through a time-set SCR and a super-saturated reactor or by superimposing two electric power sources one over another. The high frequency voltage superimposed welding current can be obtained by connecting a high frequency voltage generating circuit to the circuits. The basic waveform welding current can Table 1 shows that at high arc ceasing times, such as in Examples 2 and 6, there is very poor penetration of the molten metal. Good welds can be obtained, on the other hand, when the arc ceasing time is of a comparatively small period as in the remaining Examples. The reason for this difference can be understood by reference to FIGURE 2. During the period in which the arc is established, the transfer of the metal will occur and a unit bead having a length equivalent to the sum of the distance of the arc tip travel (the torch traversing distance during $t_1$) plus the substantial diameter of a crater will be formed. This unit bead 1 will be overlapped by another unit bead 2 during $t_3$ after the arc is extinguished for a time period $t_2$. Accordingly, if the value of $t_2$ is small or the traverse rate of the torch is small, the unit bead 2 will occupy a large area of the unit bead 1 in an overlapped relationship and good penetration of the metal at the boundary between the both unit beads 1 and 2 will occur. The photographic picture shown in FIGURE 3 illustrates the corrugation of a bead formed as in Examples 1,3,4,7,8, and 9 of Table 1.

On the other hand, if $t_2$ is large or the traverse rate of the torch is great the area of the unit bead 1 occupied by the unit bead 2 will be reduced and the degree of penetration will be affected such as in Examples 2 and 6 of Table 1. However, it should be noted that in Example 5, although the time $t_2$ is extremely small, the subsequent arc was established at an elevated temperature so that significant spattering of the molten metal occurred.

As hereinabove described, in order to prevent the occurrence of poor metal penetration at the boundary between the unit beads, the unit bead 2 should be designated such as to occupy half the area of crater 1' of the unit bead 1 so that sufficient overlap of the bead 2 over bead 1 will be provided. The welding conditions to accomplish this purpose can be provided as shown by reference to FIGURE 4 in which the relationship between the arc ceasing time and the torch traversing distance is shown.

Figure 4:
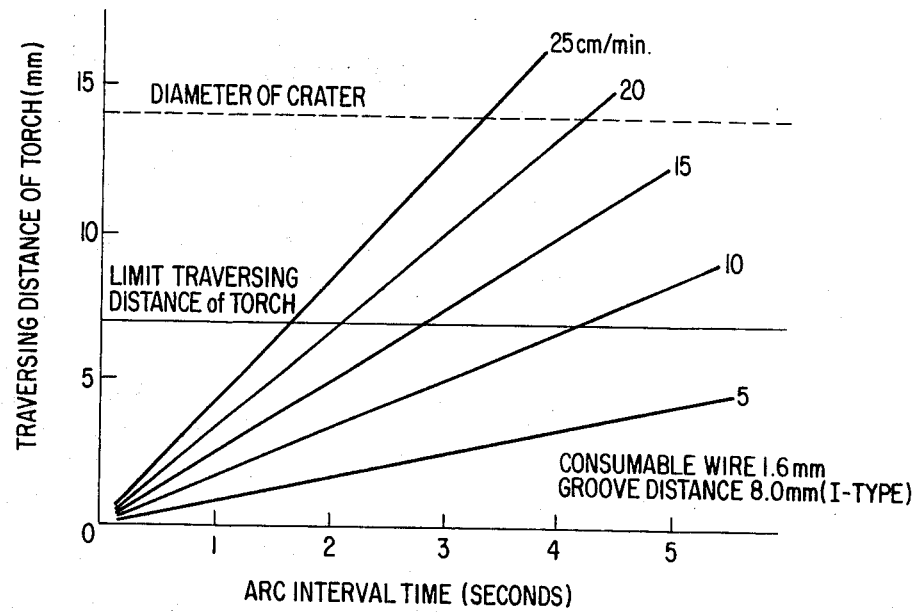
FIG. 4 is a graph showing the relationship between the non-arcing time and the traverse distance of a welding torch during the welding operation in accordance with the present invention.

As shown in FIGURE 4, when the process of the present invention is used to weld plates which are aligned to form an I-shaped groove of 8 mm. with using a wire electrode of 1.6 mm. in diameter, the diameter of the crater of the unit bead can be approximated at about 14 mm. In this instance, the traverse rate of the torch should be set at less that 7 mm. per minute and the arc ceasing time can be found from FIG. 4. Thus, a good continuous bead in which the craters are sufficiently overlapped one over another can be obtained.

It should be noted that any change in the groove shape, the width of the groove, and/or the diameter of the consumable electrode wire used will result in an alteration in the diameter of each unit bead crater. However, the suitable arcing time can usually be obtained from FIG. 1. Reference numerals 1' and 2' represent the crater of each unit bead.

It is preferred that the arc ceasing time be within the range of from 0.2 to 3 seconds. If the time is less than 0.2 seconds, the crater of each unit bead will not solidify satisfactorily, while, if the time is greater than 3 seconds, the overlapped area of the unit beads will be reduced and the possibility of poor penetration will be increased.

Figure 5:
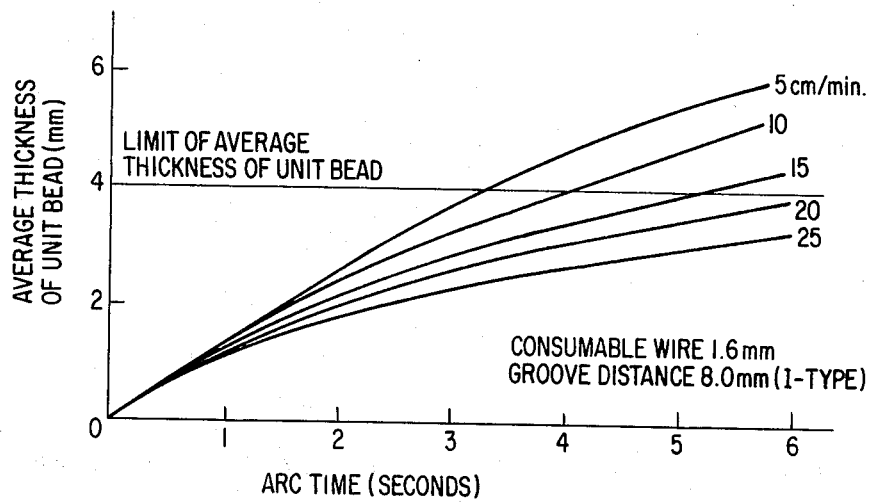
FIG. 5 is a graph showing the relationship between the arcing time and the average thickness of the unit bead formed during said arcing time.

If the value of the arcing times are high, regardless of whether the invention is practiced in the overhead or flat welding positions, an excessive deposit of molten metal may increase the incidence of spattering or may result in a bead of poor corrugation. In order to prevent such defects, the arcing time should be restricted in accordance with the thickness of each unit bead. FIG. 5 shows the relationship between the arcing time and the average thickness of the unit bead formed during the arcing time when the process is applied to an 8 mm. I-shaped groove with the use of 16 mm. electrode wire. As illustrated in Table 1, when the traverse rate of the torch is 15 cm/min., spattering occurs when the arcing time is 5.5 seconds (as in the case of Example 11). Under these conditions, spattering is slight at arcing times of 4.5 seconds (as in the case of Example 12). However, as the arc time is reduced to a value of 2 seconds, a good weld can be obtained. From the above, it can be said that if the arc time is adjusted to form a unit bead having the average thickness of less than 4 mm., a good bead can be obtained, whereas if the arc time is adjusted so as to form a unit bead having an average thickness of more than 4 mm., spattering of molten weld metal and/or poor weld penetration may occur.

However, the relationship shown in FIG. 5 cannot be established if the width opening of the groove and the diameter of the electrode wire change. Nevertheless, even if such a change occurs, a similar relationship can be obtained by the same procedure as described above.

The reason for the arcing time being defined in the range of 0.3 to 5 seconds in the present invention is because if the value of the arcing time is less than 0.3 seconds, the arc thus established will be unstable so that sufficient molten metal penetration cannot be obtained. On the other hand, if the value is greater than 5 seconds, the thickness of each unit bead will increase so that spattering may occur when the process is practiced in the vertical or overhead welding positions. It should be understood, however, that the arc time may be elongated when in the flat welding position.

The electrode wire which may be employed in the process of the present invention is either a bare consumable wire electrode of the type conventionally used in gas shielding arc welding or a fluxed consumable wire electrode. The diameter of the electrode wire should preferably be within the range of 0.8 to 2.4 mm. depending upon the current density of the arc. If the value of the diameter of the electrode wire is less than or exceeds these ranges, a sufficiently stabilized bead cannot be obtained.

In order to improve the mechanical properties of the resulting weld, according to the present invention, welding should be performed using a shielding gas. A wide variety of conventional shielding gases may be used, such as Argon, $CO_2$, or a mixture thereof. The particular shielding gas to be used for a given situation may vary depending upon the material of the plates to be welded, the thickness of the plates, the width of the groove, the diameter of the consumable electrode wire, the type of consumable electrode wire, the welding position, as well as many other variables. However, the shielding gas is normally supplied from a position above the groove through a nozzle of the welding torch. On the other hand, when the plates to be welded are greater than 50 mm. in thickness, the gas is normally supplied through a nozzle in the welding torch positioned at the groove.

According to the present invention, good results are obtainable in terms of improved arc stability, depth penetration, and depositing speed if the current density is within the range of 100 to 300 amp/mm². However, this range of current density is based on a spray or globular transfer of metal droplets when the diameter of the consumable electrode is in the range of from 0.8 to 2.4 mm. The value of the current density may vary over a much wider range depending upon the diameter of the consumable electrode wire to be used.

Although the construction of the present invention has been fully hereinbefore described, the advantages of the present invention are as follows:

1. An efficient weld can be obtained from any welding position including vertical, overhead or horizontal welding positions. Since an arc of comparatively high current density is established for welding, the average rate of deposition is comparatively great despite the fact that the arc is intermittently established. The efficiency of the present process for all positions, therefore, is at least as high as for gas shielded arc welding processes performed in the flat position.

2. When the arc current density is within the range of from 100 to 300 amp/mm², a weld can be obtained without spattering of metal droplets in the vertical or overhead position since the formation of the bead is controlled by adjusting the arcing time and the arc ceasing time.

3. Since the arc is a spray or globular arc of high current density, satisfactory penetration can be obtained. In the process of the present invention, a single bead is formed for each pass and therefore the difficulties in penetration incurred in conventional processes, wherein a single bead is formed by a plurality of passes, does not occur.

4. A reduction in heat input may be appreciated as compared to prior art processes. In the process of the present invention, the arc is intermittently established with consequent reduction in heat input. The average amount of heat input, therefore, per weld length can be reduced as compared with conventional continuous arc welding processes. As a whole, according to the present invention, welding can be performed with the application of a high current with reduced heat input, and hence is applicable for welding high tensile strength steels which require that the amount of heat input be restricted.

5. The growth of crystalline particles of deposited weld metal occurs essentially for each unit bead and therefore the average size of the crystalline particles can be reduced. Moreover, since the unit bead is re-heated upon the formation of a subsequent unit bead to a temperature close to the melting point, the crystalline particles tend to become very fine. A deposited weld metal of a fine crystalline particle structure can thus be obtained according to the process of the present invention and, as a result, the notch toughness can be improved. In addition to the heat input characteristic, the process of the present invention can be applied with good results for welding of high tensile strength steels from any welding position.

The process of the present invention, therefore, can satisfactorily be applied for welding thick plates in contrast to the capability of conventional prior art processes.

Having generally described the invention, a further understanding can be obtained by reference to certain specific Examples which are included herein for purposes of illustration only and are not intended to be limiting in any manner. Unless otherwise noted, all designations of per cent and parts are to be construed as per cent by weight or part by weight.

EXAMPLE 1

A weld was made in each pair of 32 mm. thick plates of SM-50 steel with a groove having a width as listed in Table 2, in the vertical position and downhand position in accordance with the process of the present invention. The welding current each had a value in the range of from 260 to 450 amp. D.C. (R.P.) and a voltage in the range of from 27 to 38 volts. Oscilloscopic records of the welding current showed that the basic wave-form had an arcing time of one second and an arc ceasing time of half a second. The shielding gas contained 85 percent Argon and 15 percent $CO_2$ and was supplied at the rate of 30 lit/min. The torch traversing rate was in the range of from 10 to 20 cm/min., and the electrode used was a fluxed consumable electrode wire (DWS–50) for use in welding of soft steel. The diameter of the wire was in the range of from 1.2 to 2.4 mm.

Good welds were obtained in four pairs of the plates, numbered 1 through 3, having an I-shaped groove, and three pairs of the plates, numbered 5 through 7, having a V-shaped groove. On the contrary, poor weld penetration was observed in plate 4 having an I-shaped groove, and in plates numbered 8 and 9, having a V-shaped groove.

TABLE 2

| Groove no. | 1 | 2 | 3 | 4 | 5 | 6 | 7 | 8 | 9 |
|---|---|---|---|---|---|---|---|---|---|
| Upper width of groove in mm. | 4 | 4 | 8 | 15 | 17 | 8.6 | 13 | 15 | 17 | 17 |
| Root width of groove in mm. | 4 | 4 | 8 | 15 | 17 | 2 | 2 | 10 | 10 | 15 |
| Dia. of bare consumable electrode | 1.2 | 1.6 | 2.4 | 2.4 | 1.2 | 1.6 | 2.4 | 2.4 | 2.4 |
| Groove angle, degrees | 0 | 0 | 0 | 0 | 12 | 20 | 10 | 12 | 3 |

Figure 7:
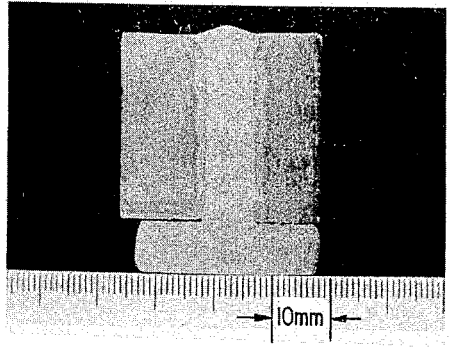
FIG. 7 is a photomicrograph of a cross-section of a weld formed in accordance with the welding process of the present invention.
Figure 6:
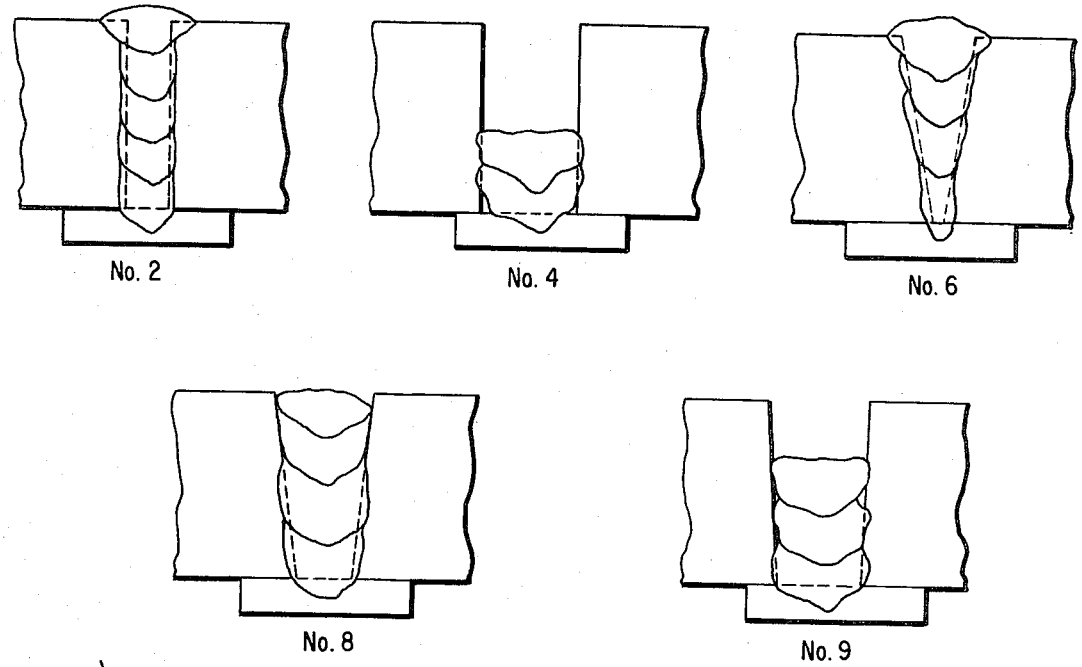
FIG. 6 is a diagram showing the various types of grooves formed in a workpiece to be welded, each of which is welded in accordance with the welding process of the present invention.

A process of bead formation in No. 2, No. 4, No. 6, No. 8, and No. 9 is shown in FIG. 6. The microphotographic picture shown in FIG. 7 is the cross-section of No. 2.

The reason for the poor penetration in No. 4 was because the groove width was comparatively great and, therefore, the arc could not fuse the sidewalls of the groove. The poor penetration in Nos. 8 and 9 was because the value of the upper width of each of the grooves was comparatively great and, therefore, sufficient filleting of metal into the upper portion of the sidewalls of each of the said grooves could not be obtained.

However, where the width opening of an I-shaped groove is less than 4 mm., an arc will be established at a position between the tip of the electrode and one of the groove faces, that is to say, abnormal arc will not be established between the depth of the groove and the electrode tip and, as a result, poor penetration will occur at the depth of the groove and the other groove face.

EXAMPLE II

A weld was made in a pair of 32 mm. thick plates of SM–50 steel with an I-shaped groove having a width as listed in Table 3, using a vertical position in accordance with the process of the present invention. The electrode used as a bare consumable electrode wire (MGS–50) for use in welding of 50 kg/mm² high tensile strength steel. The diameter of the wire was 1.6 mm. The other welding conditions as listed in Table 3 were used.

For comparison, test samples using conventional spray arc welding conditions in the flat welding position were also prepared.

As can be seen from Table 3, there is no major difference between the process of the present invention and the conventional process in terms of the strength of the joint formed and the notch toughness.

EXAMPLE III

Since the process of the present invention is partly characterized in that it requires a low heat input, it can be used for welding high tensile strength steel. Table 4 shows the results of notch impact tests subjected to joints formed in accordance with the process of the present invention. For this Example, a pair of 25 mm. thick HY–80 steel plates were welded in the vertical position. The welding current was 300 amp. D.C. (R.P.) at 29 volts. The groove was I-shaped with a width opening of 8 mm. The shielding gas was prepared with Argon and oxygen in the proportion of 2 percent vol. and was supplied at the rate of 30 lit/min. The arcing time was 0.8 second and the arc ceasing time was 0.5 second. The traverse rate of the torch was 15 cm/min. The electrode used was a consumable electrode wire of 1.6 mm. in diameter for use in welding of HY–80 steels (MGS–75).

A control test piece was prepared by a conventional welding process in a flat welding position using the following conditions:

The welding current was 300 amp. D.C. (R.P.) at 29 volts, the welding speed was at the rate of 20 cm/min., the groove was V-shaped having a groove angle of 60° at the rate of 2:1; the shielding gas was prepared with Argon and oxygen in the proportion of 2 percent vol. and was supplied at the rate of 25 lit/min.

The heat input in the process of the present invention performed in the vertical welding position was 21,400 J/cm while the heat input in the conventional process performed in the flat welding position was 26,100 J/cm. In other words, the heat input in the process of the present invention was lower than that in the conventional process. Nevertheless, the HY–80 steel plates were satisfactorily welded together with improved impact strength as shown in Table 4.

TABLE 3

| | Welding current | | Torch traversing speed (cm./min.) | Arc time (sec.) | Arc ceasing time (sec.) | Average heat input (kj./cm.) | Tensile strength of joint (kg./mm.²) | Broken position | Results of notch impact test (kg.-m.) |
|---|---|---|---|---|---|---|---|---|---|
| | Amps (A, DC-RP) | Volts | | | | | | | |
| I | 300 | 30 | 15 | 1.5 | 1.2 | 20.0 | 56.5 | Workpiece | 6.1 |
| II | 300 | 30 | 15 | 1.2 | 0.8 | 21.6 | 55.4 | do | 7.2 |
| III | 300 | 30 | 10 | 1.0 | 1.0 | 27.0 | 53.8 | do | 6.7 |
| IV | 300 | 29 | 30 | | | 17.4 | 53.8 | do | 6.9 |

NOTE.—Numerals I, II and III represent the process of the present invention, while numeral IV represents the conventional process.

TABLE 4

| | Welding position | Average heat input (kj./cm.) | Tensile strength of joint (kg./mm.²) | Broken position | Results of −50° C. 2 mm. V-notch impact test (kg./m.) |
|---|---|---|---|---|---|
| Inventive process | Overhead | 21.4 | 78.5 | Workpiece | 7.2 |
| Conventional process | Flat | 26.1 | 78.2 | do | 6.9 |

EXAMPLE IV

A weld was made in a pair of 32 mm. thick plates of SM–50 steel with an I-shaped groove having a width of 8 mm. A P-type wave-form welding current was applied using the following welding conditions.

As a result, the welding arc was smoothly re-established with improved weld penetration into the both sidewalls of the groove. A noticeable reduction in spattering as compared with that occurring with basic wave-form welding currents was observed. The bending tests showed a resistance of up to 180°.

i. Consumable Electrode Wire Used:
1.6 mm. in diameter,
Fluxed Electrode DWS-50 ii. Shielding Gas Used:
Ar + 15% Vol. $CO_2$
supplied at the rate of 30 lit/min.

iii. Welding Conditions Employed (five layer welding)
Welding current:
Amps—300 DC-RP
Volts—30
Arc Time—2.0 Seconds
Pilot Welding Current:
Amps—30 DC-RP
Volts—14
Pilot Arc Time—2.5 Seconds
Welding Speed:
15 cm/min.

EXAMPLE V

To show the welding efficiency of the present invention, the process of the present invention was compared with a conventional spray welding process performed in the flat position. The results of a conventional short arc welding process performed in the vertical position are summarized in Tables 5 and 6.

TABLE 5

| | Present process | Short arc process | Spray arc process |
|---|---|---|---|
| Consumable electrode | DWS-50 1.6 mm. | MG-52 1.2 mm. | MGS-50 1.6 mm. |
| Welding current | 300A-29V- 15 cm/min. | 150A-19V- 17 cm/min. | 300A-29V- 30 cm/min. |
| Shielding Gas | Ar + 15% $CO_2$ | $CO_2$ | Ar + 2% $O_2$ |
| Welding position | Vertical | Vertical | Flat |
| Arc time— | 1 sec.— | | |
| Arc ceasing time | 0.5 sec. | Continuous | Continuous |
| Amount of deposit per unit time | 51 g/min. | 32 g/min. | 76 g/min. |

TABLE 6

The plates used were 19 mm. thick.

Figure 8:
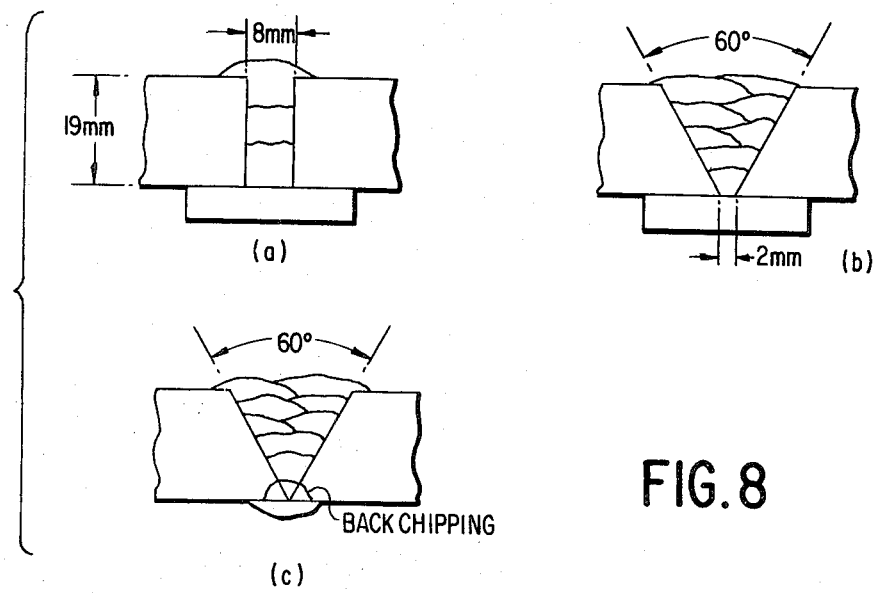
FIG. 8 is a diagram showing the dimensions of each of the grooves employed in the present invention.

| | Present process | Short arc process | Spray arc process |
|---|---|---|---|
| Welding position | Vertical | Vertical | Flat |
| Shape of groove | FIG. 8a | FIG. 8b | FIG. 8c |
| Cross-section of groove | 152 mm² | 240 mm² | 247 mm² |
| Number of pass | 3 | 8 | 8 |
| Time necessary to weld per 1 meter (minutes)* | 23 | 58 | 25 |

NOTE: *indicates a value of the volume of the groove of 1 meter multiplied by 7.8 divided by the amount of deposit per unit time.

As can be understood from the above, the time necessary to form a weld of 1 meter along the weld line is substantially equal to that in conventional spray arc welding processes and is considerably less in comparison to that in short arc welding processes. Substantially the same welding efficiency, however, is obtainable in using the vertical welding position.

Although in Example IV the arcing time and arc ceasing time were respectively, 1 second and 0.5 sec., by expanding the arcing time and by reducing the arc ceasing time, workpieces which are not heat sensitive can be satisfactorily welded and the amount of deposited weld metal per unit time can be increased. In addition, the same results can also be obtained by reducing the width of the groove with improved welding efficiency.

As was described above, the present invention pertains to a consumable electrode gas shielded arc welding process wherein plates which are aligned to form a narrow groove can be welded from any welding position by using an intermittently established arc having a current density of from 100 to 300 amp/mm² to affect transfer of spray or globular metal. The value of the current density may vary, however, depending upon the diameter of the consumable electrode wire used. The process of the present invention can be applied for welding thick plates having any narrow groove by adjusting the arcing time and the arc ceasing time and also by varying the ambient conditions in which the welding operation is performed. Accordingly, a good weld of high quality can be provided in any welding position with high efficiency. The process of the present invention, therefore, differs substantially from other conventional arc welding processes in terms of method of application and field of potential applicability.

Having now fully described the invention, it will be apparent to one of ordinary skill in the art that many changes and modifications can be made without varying from the spirit or scope thereof. Accordingly,

What is claimed and intended to be covered by Letters Patent is:

1. A process for multi-layered spray arc welding using a consumable electrode which comprises:
preparing the welding edge of each of a pair of plate members having a thickness of at least 12 mm. such that when said members are placed into welding alignment, the combination of their prepared edges will together form a narrow welding line groove between said members,
placing said plate members into welding alignment so as to form said welding groove, and spray arc welding said plate members along said welding line groove with a consumable electrode by passing a welding current having a rectangular wave-form through said electrode to said welding line, such that at recurring intervals, a gas shielded welding arc having a current density of from 100 to 300 amp/mm² is established between the tip of said consumable electrode and said welding line groove for a period of time of from 0.3 to 5 seconds, and extinguished for a period of time of from 0.2 to 3 seconds, such that when said arc is established, molten metal droplets are transferred to said groove, and when said arc is extinguished, the transfer of molten metal droplets is interrupted, and moving said electrode at a rate such that for each interval of arcing time a deposit will be formed which will partially overlap the deposit formed during the preceding arcing interval.

2. The process of claim 1, wherein said plate members are characterized by a thickness of at least 12 mm. at their welding edges.

3. The process of claim 1, wherein said plate members are welded in an overhead position.

4. The process of claim 1, wherein during the period in which the welding arc is extinguished, the welding voltage and the welding current are reduced to a value of less than the maximum voltage in current occurring during the period in which the welding arc was established, so as to establish a pilot arc between the tip of the consumable electrode and the welding line groove for the purpose of facilitating the re-establishment of the welding arc when the amperage and voltage are returned to their maximum values.

5. The process of claim 1, wherein said plate members are composed of high tensile strength steel.

6. The process of claim 1, wherein during the period in which the arc is extinguished, the welding voltage and the welding current are reduced to zero.

7. The process of claim 6, wherein a high frequency voltage is synchronously superimposed over said rectangular waveform welding current during the period in which said welding arc is extinguished and said welding current is at its zero value, so as to provide a high frequency arc discharge prior to the reestablishment of the welding arc.

8. The process of claim 1, wherein said welding line gRoove is I-shaped.

9. The process of claim 8, wherein said plate members are aligned such that the width of said welding line groove is from 4 to 15 millimeters.

10. The process of claim 1, wherein said welding line groove is V-shaped.

11. The process of claim 10, wherein said plate members are aligned such that the width of said welding line groove is 0 to 15 mm. at its narrowest point and from 4 to 15 mm. at its widest point.

* * * * *